(12) United States Patent
Li et al.

(10) Patent No.: US 11,296,505 B2
(45) Date of Patent: Apr. 5, 2022

(54) METHOD FOR ANALYZING CORRELATION BETWEEN DIFFERENT LINE LOSS ACTIONS

(71) Applicant: University of Electronic Science and Technology of China, Sichuan (CN)

(72) Inventors: Jian Li, Sichuan (CN); Qi Huang, Sichuan (CN); Haotian Chang, Sichuan (CN); Weihao Hu, Sichuan (CN); Dongsheng Cai, Sichuan (CN); Zhenyuan Zhang, Sichuan (CN); Jianbo Yi, Sichuan (CN); Jianhua Zhou, Sichuan (CN); Zhibin Deng, Sichuan (CN); Xiaofeng Hu, Sichuan (CN)

(73) Assignee: University of Electronic Science and Technology of China, Chengdu (CN)

(*) Notice: Subject to any disclaimer, the term of this patent is extended or adjusted under 35 U.S.C. 154(b) by 70 days.

(21) Appl. No.: 15/931,678

(22) Filed: May 14, 2020

(65) Prior Publication Data
US 2020/0366092 A1   Nov. 19, 2020

(30) Foreign Application Priority Data
May 15, 2019   (CN) .......................... 201910406314.4

(51) Int. Cl.
*H02J 3/00*   (2006.01)
*G06Q 50/06*   (2012.01)

(52) U.S. Cl.
CPC ............. *H02J 3/003* (2020.01); *G06Q 50/06* (2013.01); *H02J 3/004* (2020.01); *H02J 3/0012* (2020.01); *H02J 2203/20* (2020.01)

(58) Field of Classification Search
CPC ...... H02J 3/003; H02J 3/0012; H02J 3/00125; H02J 3/004; H02J 3/0075; H02J 13/00; H02J 2203/20; H02J 2213/00; G06Q 50/06; G06Q 10/063; Y02E 40/70; Y02E 60/00; Y04S 10/50; Y04S 10/52; Y04S 40/20; G06F 16/2462; G06F 16/24578; G05B 23/0221
See application file for complete search history.

(56) References Cited

U.S. PATENT DOCUMENTS 10,600,036 B2 *   3/2020 Son ......................... G06Q 10/20
2009/0113049 A1 *   4/2009 Nasle ................. G05B 19/0428
                                                                  709/224

(Continued)

*Primary Examiner* — M. N. Von Buhr
(74) *Attorney, Agent, or Firm* — Crowe & Dunlevy; Jeremy B. Berman

(57) ABSTRACT

A method is for analyzing the correlation between different line loss actions, which records, for each individual to which line loss actions occur, all the line loss actions that occur to the individual; and counts, based on two categorization manners: by individual and by line loss action, line loss actions recorded in the database, to obtain line loss action counting results corresponding to respective categorization manners; then, based on the two counting results, collects respective multi-line loss action sequences; and acquires probability data as a data source for probability calculation, to obtain line loss action occurrence conditional probabilities for different line loss actions, so that a targeted a targeted loss reduction plan can be formulated.

1 Claim, 2 Drawing Sheets

(56) References Cited

U.S. PATENT DOCUMENTS

| | | | |
|---|---|---|---|
| 2013/0253898 A1* | 9/2013 | Meagher | G06N 20/00 703/18 |
| 2016/0019218 A1* | 1/2016 | Zhang | G06F 16/2457 707/727 |
| 2016/0247065 A1* | 8/2016 | Nasle | G06N 5/02 |
| 2016/0364648 A1* | 12/2016 | Du | G06N 20/00 |
| 2018/0240202 A1* | 8/2018 | Sheng | G06Q 50/06 |
| 2018/0364874 A1* | 12/2018 | Herlong, II | H02J 13/00034 |
| 2020/0003821 A1* | 1/2020 | Muenz | H02J 3/24 |

* cited by examiner

METHOD FOR ANALYZING CORRELATION BETWEEN DIFFERENT LINE LOSS ACTIONS

RELATED APPLICATION

This application claims priority to Chinese Patent Application Number 201910406314.4, filed May 15, 2019, the contents of which are incorporated by reference in their entirety to the maximum extent allowable under the law.

TECHNICAL FIELD

The present disclosure relates to the technical field of line loss analysis, and more specifically, a method for analyzing the correlation between different line loss actions.

BACKGROUND

With the rapid development of China's electric power industry, the scale of power grids for transmitting and distributing electrical energy is expanding. A certain degree of energy loss occurs in the process of electrical energy transmission and distribution. In the field of electric power techniques, the energy loss in the form of heat, i.e., the active power consumed by the resistors and conductors, is called line loss. Line loss rate refers to the percentage of electrical energy loss in the power grid (line loss load) in relation to the electrical energy supply to the power grid (power supply load). Line loss rate is a major indicator for the assessment of cost efficiency of an electric power system. China's electric power utilization level has been increasing for the past 20 years; however, compared with the more advanced power grids in some countries, more energy loss exists due to technical and management reasons, and a higher line loss rate in the transmission. As China increases the amount of electrical energy transmitted by the power grid over the years, more electricity will be lost in the transmission. Therefore, it is desirable to reduce line loss rate and improve power transmission efficiency through technical and management measures, to release the great potential of energy saving and consumption reduction.

With the advancement of science and technology and the development of China's electric power industry, in order to realize intelligent management of line loss, improve the work efficiency of line loss managers, and increase the utilization rate of data and improve the level of operation and management, there is an urgent need that power supply companies employ a series of line loss action analysis methods for electric power distribution networks and low voltage networks that are inexpensive, easy to use, efficient and can meet calculation accuracy and precision requirements, realizing scientific management of line loss, improving the level of management and achieving line loss reduction and increasing economic efficiency.

Loss analysis is a method to analyze the rationality of network structure and operation mode, and the scientificity of distribution network loss management and loss vulnerabilities in the distribution network, by calculating a theoretical loss and comparing it with a statistical loss, according to power grid parameters such as load power and actual voltage. Loss analysis mainly includes two sub-directions: the study of theoretical line loss rate calculation, and the study of factors affecting the loss in medium-to-low voltage distribution networks.

Currently, two problems are present in the study of distribution network energy saving and loss reduction: most distribution network line loss managements only calculate a line loss rate and do simple statistics, without looking for important factors affecting the loss in the distribution networks based on existing line loss management and loss analysis, resulting in aimless loss reduction work and lack of guidance in the optimization and implementation of loss reduction measures; most distribution network loss reduction studies aim at only one aspect of the loss vulnerabilities in the distribution network, and on the optimization and implementation of a single loss reduction measure, which would not be effective in actual distribution networks where multiple loss reduction measures are deployed together, and the study of single loss reduction measures is not suitable for obtaining a distribution network loss reduction method that is based on multiple loss reduction measures due to cost limitations and the requirements on the optimization of the comprehensive loss reduction benefits.

SUMMARY OF INVENTION

An object of the present disclosure is to overcome the drawbacks of the prior art, and to provide a method for analyzing the correlation between different line loss actions, which counts and analyzes single line loss actions, multi-line loss action sequences and associated line loss actions, increasing the knowledge on internal relationships between the line loss actions, improving the study on distribution network loss reduction methods based on multiple loss reduction measures, improving the management level of line loss, and achieving line loss reduction and increasing economic efficiency.

In order to achieve the above object, the present disclosure provides a method for analyzing the correlation between different line loss actions, including the following steps:

(1) acquiring data and performing data preprocessing by:

for each user, recording different line loss actions that occur to the user each day, and processing into and storing, in a table, the form of a correspondence between the user and all its line loss actions, the stored table being named as a user-line loss action table;

(2) acquiring various indicators for the analysis of the correlation based on the user-line loss action table by: (2.1) acquiring a single line loss action count table by:

for each kind of line loss action, in the user-line loss action table, counting the number of occurrences of the kind of line loss action, where each line loss action that occurs to a user is counted as one occurrence, and storing a correspondence between the kind of line loss action and its number of occurrences, the stored table being the single line loss action count table;

(2.2) acquiring a line loss action sequence count table by:

from the user-line loss action table, for each user, forming a sequence from all the line loss actions that occur to the user, the sequence being named as a line loss action sequence;

for each line loss action sequence, counting the number of occurrences of the line loss action sequence among the line loss action sequences of all users, and acquiring and storing a correspondence between the line loss action sequence and its number of occurrences, the stored table being the line loss action sequence count table;

(2.3) acquiring an associated line loss action count table by:

(2.3.1) naming the line loss action sequence of an ith user in the line loss action sequence count table as $S_i$; naming the number of occurrences of $S_i$ as $n_i$; and naming the number of line loss actions included in $S_i$ as $l_i$;

(2.3.2) picking up 2 to ($l_i$-1) line loss actions from the line loss action sequence $S_i$ respectively, to form a variety of line loss action subsequences, the line loss action subsequences being named as associated line loss actions; and deeming the number of occurrences of an associated line loss action from the line loss action sequence $S_i$ as the number of occurrences of $S_i$ in the line loss action sequence count table;

(2.3.3) processing all the line loss action sequences $S_i$ in the line loss action sequence count table according to steps (2.3.1) to (2.3.2), to acquire the associated line loss actions and their numbers of occurrence for all the users; combining the numbers of occurrence of the same kind of associated line loss actions, and storing, in a table, correspondence between the kind of associated line loss actions and its number of occurrences, the stored table being the associated line loss action count table;

(2.4) acquiring a line loss action occurrence conditional probability table by:

(2.4.1) if a line loss action A is known to have occurred, the probability of a line loss action B occurring, i.e., the conditional probability of the line loss action B given a line loss action A, P(B|A) is:

$$P(B \mid A) = \frac{N_{AB}}{N_A}$$

where $N_A$ denotes the number of occurrences of the line loss action A, $N_{AB}$ denotes the number of the cases where both the line loss action A and the line loss action B occur;

(2.4.2) according to the calculation of (2.4.1), using the single line loss actions from the single line loss action count table and the associated line loss actions from the associated line loss action count table as a line loss action A that is known to have occurred, using all the line loss actions that occur at the same time as the line loss action A and a combination of these line loss actions as a line loss action B that is conditional, and calculating a line loss action occurrence conditional probability for each and every case and storing the results in a table, the stored table being the line loss action occurrence conditional probability table;

(3) analyzing the correlation between different line loss actions by:

(3.1) performing high-frequency line loss action and sequence analysis by:

sorting the line loss actions and the line loss action sequences in the single line loss action count table, the line loss action sequence count table and the associated line loss action count table in a descending order according to the number of occurrences, to obtain a frequency ordered result for the line loss actions and line loss action sequences; acquiring a high-frequency line loss action from the frequency ordered result; and formulating a targeted loss reduction plan based on the high-frequency line loss action;

(3.2) performing early warning analysis of line loss actions by:

for the line loss action occurrence conditional probability table, determining a lower threshold for the number of occurrences, and if the number of occurrences of a line loss action A that is known to have occurred is less than M, considering the calculated conditional probability as invalid and discarding it; and sorting the line loss action occurrence conditional probability table, excluding invalid conditional probability data, in a descending order according to the conditional probability, to obtain cases with a high conditional probability, so that when a certain line loss action is known to have occurred, a targeted loss reduction plan can be formulated for those line loss actions with a high conditional probability.

The object of the present disclosure is realized as follows:

The method for analyzing the correlation between different line loss actions according to the present disclosure records, for each individual to which line loss actions occur, all the line loss actions that occur to the individual; and counts, based on two categorization manners: by individual and by line loss action, line loss actions recorded in the database, to acquire line loss action counting results corresponding to respective categorization manners; then, based on the two counting results, collects respective multi-line loss action sequences; and acquires probability data as a data source for probability calculation, to obtain line loss action occurrence conditional probabilities for different line loss actions, so that a targeted a targeted loss reduction plan can be formulated.

The method for analyzing the correlation between different line loss actions according to the present disclosure has the following beneficial effects:

(1) By analyzing the single line loss actions, high-frequency line loss actions and a ranking of the line loss actions in a specified area can be obtained, which furthers the understanding of main line loss actions in the specified area, and lays a foundation for the formulation of a loss reduction plan.

(2) By analyzing the two indicators of line loss action sequence and associated line loss action sequence, high-frequency line loss actions and a ranking of the line loss actions in a specified area can be obtained, determining which line loss actions often occur at the same time. On this basis, knowledge of internal relationships between the line loss actions in the specified area is improved, which lays a foundation for further analysis of the relationships between different line loss actions.

(3) By analyzing the conditional probabilities of different line loss actions, the possibility of line loss actions occurring separately or jointly under the condition that some other line loss action(s) has/have occurred is obtained. Therefore, in the event that one or more line loss actions are known to have occurred, a relevant loss reduction plan can be formulated in advance, thereby providing a strong technical support for the loss reduction work.

DETAILED DESCRIPTION OF PARTICULAR EMBODIMENTS

For a better understanding of the present disclosure by those skilled in the art, specific embodiments of the present disclosure will be described herein in conjunction with the accompanying drawings. It should be noted that detailed description of known functions or designs will be omitted for clarity purposes.

Embodiments will now be described.

Figure 1:
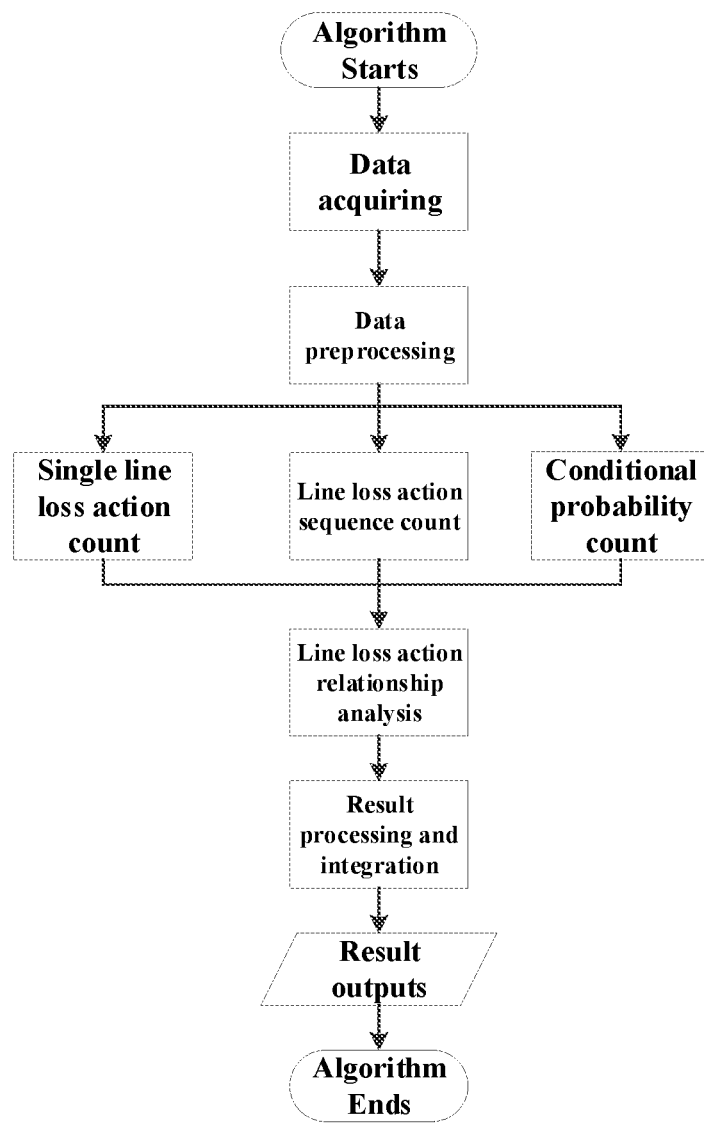
FIG. 1 is a flow chart of a method for analyzing the correlation between different line loss actions according to the present disclosure.

FIG. 1 is a flow chart of a method for analyzing the correlation between different line loss actions according to the present disclosure.

Figure 2:
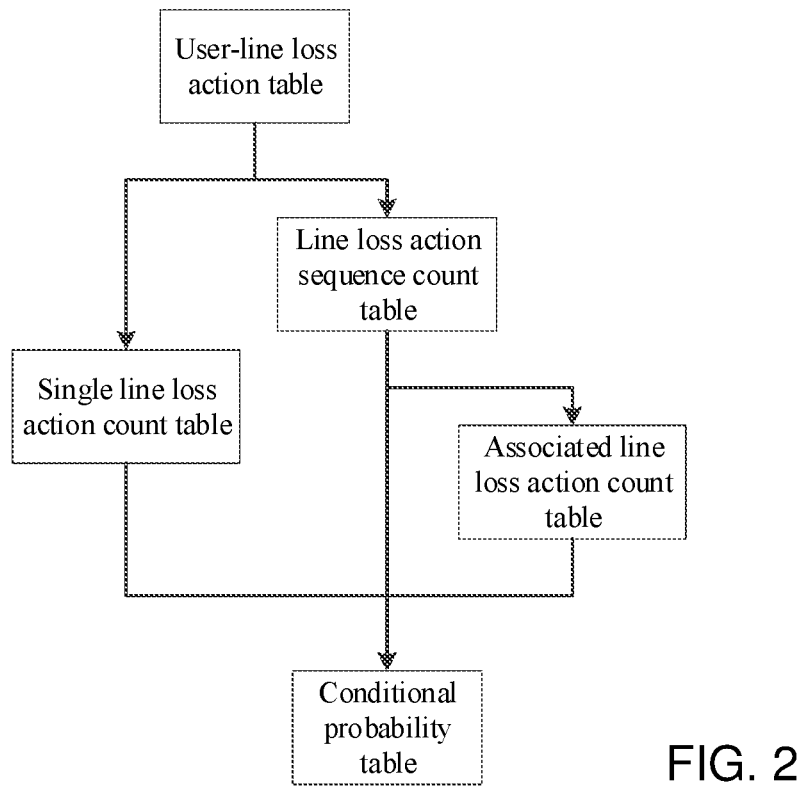
FIG. 2 is a flow chart illustrating the acquisition of various indicators for the analysis of the correlation.

In an embodiment of the present disclosure, as shown in FIG. 1, the method for analyzing the correlation between different line loss actions includes the following steps:

S1. acquiring data and performing data preprocessing by:

for each user, recording different line loss actions that occur to the user each day, and processing into and storing, in a table, a correspondence between the user and all its line loss actions, the stored table being named as a user-line loss action table;

S2. as shown in FIG. 2, acquiring various indicators for the analysis of the correlation based on the user-line loss action table by:

S2.1. acquiring a single line loss action count table by:

The user-line loss action table, categorized by user, including different line loss actions that occur to each user each day. In order to further explore the correlation between line loss actions and prepare for a subsequent calculation of a conditional probability of line loss action occurrence, based on the user-line loss action table, for each kind of line loss action, the number of occurrences of the kind of line loss action is counted and stored, where each line loss action that occurs to a user from the user-line loss action table is counted as one occurrence of the kind of line loss action, the stored table being the single line loss action count table;

S2.2. acquiring a line loss action sequence count table by:

from the user-line loss action table, for each user, forming a sequence from all the line loss actions that occur to the user, the sequence being named as a line loss action sequence;

In order to further understand the case where a maximum number of kinds of line loss actions occur at the same time and prepare for the subsequent calculation of a conditional probability of line loss action occurrence, for each line loss action sequence, the number of occurrences of the line loss action sequence among the line loss action sequences of all users is counted, and a correspondence between the line loss action sequence and its number of occurrences is acquired and stored, the stored table being the line loss action sequence count table;

S2.3. acquiring an associated line loss action count table by:

S2.3.1. naming the line loss action sequence of an ith user in the line loss action sequence count table as $S_i$, naming the number of occurrences of $S_i$ as $n_i$; and naming the number of line loss actions included in $S_i$ as $l_i$;

S2.3.2. picking up 2 to ($l_i-1$) line loss actions from the line loss action sequence $S_i$ respectively, to form a variety of line loss action subsequences, the line loss action subsequences being named as associated line loss actions; and deeming the number of occurrences of an associated line loss action from the line loss action sequence $S_i$ as the number of occurrences of $S_i$ in the line loss action sequence count table;

S2.3.3. in order to have a more comprehensive understanding of all possible line loss actions at the same time and prepare for the subsequent calculation of a conditional probability of line loss action occurrence, processing all the line loss action sequences $S_i$ in the line loss action sequence count table according to steps S2.1 to S2.3.2, to acquire the associated line loss actions and their numbers of occurrence for all the users; combining the numbers of occurrence of the same kind of associated line loss actions, and storing a correspondence between the kind of associated line loss actions and its number of occurrences, the stored table being the associated line loss action count table;

S2.4. acquiring a line loss action occurrence conditional probability table by:

S2.4.1, the single line loss action count table, the line loss action sequence count table and the associated line loss action count table acquired through steps S2.1 to S2.3 including all possible cases of line loss actions and their numbers of occurrence, which enables comprehensive calculation of line loss action occurrence conditional probabilities and prepares for a subsequent development of a preventive loss reduction plan. The conditional probability of a line loss action is defined as: if a line loss action A is known to have occurred, the probability of a line loss action B occurring, i.e., the probability of a line loss action B under the condition that a line loss action A has occurred. The conditional probability is written as:

$$P(B \mid A) = \frac{N_{AB}}{N_A}$$

In the calculation of the line loss action occurrence conditional probability, the number of occurrences of the line loss action A is used as a substitute for the probability of the line loss action A that is known to have occurred, the number of occurrences of the line loss action A being $N_A$; the number of the cases where both the line loss action A and the line loss action B occur is used as a substitute for the probability of the joint of the line loss action A and the line loss action B, the number of the cases where both the line loss action A and the line loss action B occur being $N_{AB}$. By inputting the data of $N_A$ and $N_{AB}$ to the conditional probability equation, the probability of the line loss action B under the condition that the line loss action A has occurred can be obtained, i.e., the conditional probability of the line loss action B given the line loss action A.

Figure 3:
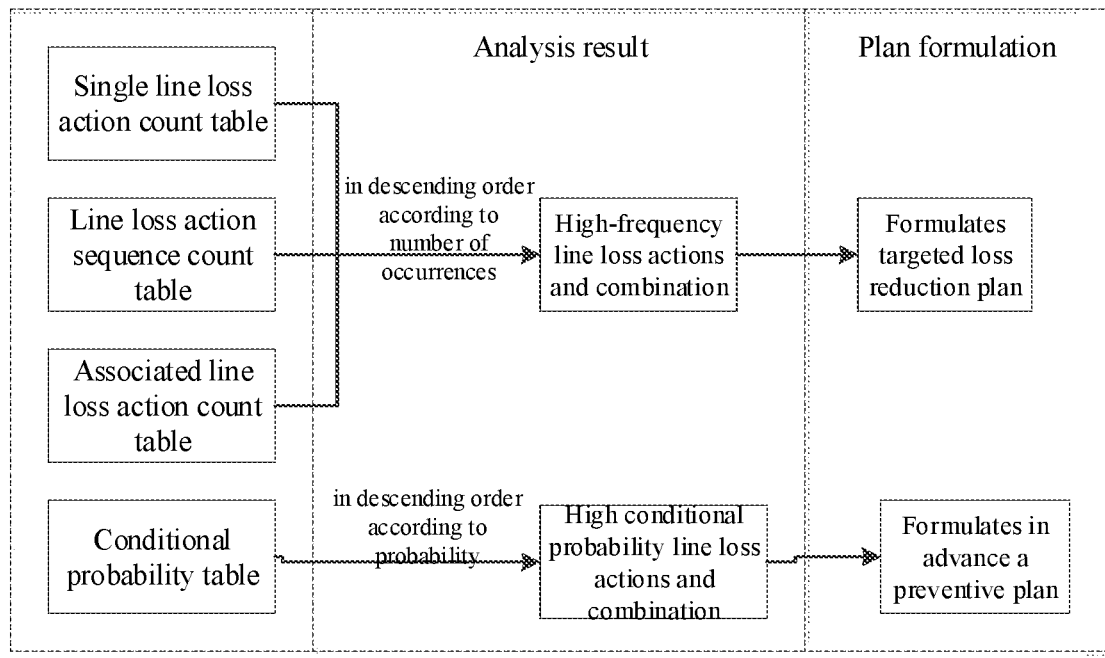
FIG. 3 is a flow chart illustrating the analysis of the correlation between different line loss actions.

S2.4.2. according to the calculation of S2.4.1, using the single line loss actions from the single line loss action count table and the associated line loss actions from the associated line loss action count table as a line loss action A that is known to have occurred, using all the line loss actions that occur at the same time as the line loss action A and a combination of these line loss actions as a line loss action B that is conditional, and calculating a line loss action occurrence conditional probability for each and every case and storing the results in a table, the stored table being the line loss action occurrence conditional probability table;

S3. as shown in FIG. 3, analyzing the correlation between different line loss actions by:

S3.1. performing high-frequency line loss action and sequence analysis by:

The line loss actions and the line loss action sequences in the single line loss action count table, the line loss action sequence count table and the associated line loss action count table being sorted in a descending order according to the number of occurrences, to obtain a frequency ordered result for the line loss actions and line loss action sequences; then a high-frequency line loss action can be acquired from the frequency ordered result; and finally a targeted loss reduction plan can be formulated based on the high-frequency line loss action.

S3.2, performing early warning analysis of line loss actions by:

A preventive loss reduction plan for high-conditional probability line loss actions being formulated based on the line loss action occurrence conditional probability table. However, the raw line loss action occurrence conditional probability table may contain misleading data. For example, if the count of a certain line loss action or sequence is 1, the conditional probability calculated according to S2.4.1 would be 100%. Data with a 100% value is considered of great importance in the analysis, but the 100% value in this example is calculated based on a low-frequency line loss action; this data may mislead the formulation of the loss reduction plan. Therefore, in the analysis based on the line loss action occurrence conditional probabilities, a lower threshold for the frequency is predetermined, and if the number of occurrences of a line loss action A that is known to have occurred is less than M, the calculated conditional probability is considered as invalid and thus discarded.

Then, the line loss action occurrence conditional probability table, excluding invalid conditional probability data, is sorted in a descending order according to the conditional probability, to obtain cases with a high conditional probability, so that when a certain line loss action is known to have occurred, a targeted loss reduction plan can be formulated for those line loss actions with a high conditional probability.

Specific embodiments of the present disclosure have been described above for illustrative purposes. It should be noted that the scope of the present invention is not limited to these embodiments. Those skilled in that art may make various variations and modifications to the embodiments described herein without deviation from the spirit and scope of the present invention as defined by the appended claims. The variations and modifications shall fall within the scope of the present invention.

The invention claimed is:

1. A method for analyzing a correlation between different line loss actions, comprising steps of:
   (1) acquiring data and performing data preprocessing by:
   for each user, recording different line loss actions that occur to the user each day, and processing into and storing, in a first table, a correlation between the user and all its line loss actions, the stored first table being named as a user-line loss action table;
   (2) acquiring various indicators for analysis of the correlation based on the user-line loss action table by:
   (2.1) acquiring a single line loss action count table by:
   for each kind of line loss action, in the user-line loss action table, counting the number of occurrences of the kind of line loss action, where each line loss action that occurs to a user is counted as one occurrence, and storing, in a second table, a correspondence between the kind of line loss action and its number of occurrences, the stored second table being the single line loss action count table;
   (2.2) acquiring a line loss action sequence count table by:
   from the user-line loss action table, for each user, forming a sequence from all the line loss actions that occur to the user, the sequence being named as a line loss action sequence; and
   for each line loss action sequence, counting a number of occurrences of the line loss action sequence among the line loss action sequences of all users, and acquiring and storing, in a third table, a correspondence between the line loss action sequence and its number of occurrences, the stored third table being the line loss action sequence count table;
   (2.3) acquiring an associated line loss action count table by:
   (2.3.1) naming the line loss action sequence of an ith user in the line loss action sequence count table as $S_i$; naming a number of occurrences of $S_i$ as $n_i$; and naming a number of line loss actions included in $S_i$ as $l_i$;
   (2.3.2) picking up 2 to $(l_i-1)$ line loss actions from the line loss action sequence $S_i$ respectively, to form a variety of line loss action subsequences, the line loss action subsequences being named as associated line loss actions; and
   deeming a number of occurrences of an associated line loss action from the line loss action sequence $S_i$ as the number of occurrences of $S_i$ in the line loss action sequence count table;
   (2.3.3) processing all the line loss action sequences $S_i$ in the line loss action sequence count table according to steps (2.3.1) to (2.3.2), to acquire the associated line loss actions and their numbers of occurrence for all the users; and combining numbers of occurrence of the same kind of associated line loss actions, and storing, in a fourth table, a correspondence between the kind of associated line loss action and its number of occurrences, the stored fourth table being the associated line loss action count table;
   (2.4) acquiring a line loss action occurrence conditional probability table by:
   (2.4.1) if a line loss action A is known to have occurred, a probability of a line loss action B occurring, which is a conditional probability of the line loss action B given a line loss action A, represented as P(B|A) is:

$$P(B \mid A) = \frac{N_{AB}}{N_A}$$

where $N_A$ denotes a number of occurrences of the line loss action A, $N_{AB}$ denotes a number of cases where both the line loss action A and the line loss action B occur;
   (2.4.2) according to step (2.4.1), using single line loss actions from the single line loss action count table and associated line loss actions from the associated line loss action count table as a line loss action A that is known to have occurred, using all line loss actions that occur at the same time as the line loss action A and a combination of these line loss actions as a line loss action B that is conditional, and calculating a line loss action occurrence conditional probability for each and every case and storing results in a fifth table, the stored fifth table being the line loss action occurrence conditional probability table;
   (3) analyzing the correlation between different line loss actions by:
   (3.1) performing a high-frequency line loss action and sequence analysis by:
   sorting the line loss actions and the line loss action sequences in the single line loss action count table, the line loss action sequence count table and the associated line loss action count table in a descending order according to number of occurrences, to obtain a frequency ordered result for the line loss actions and line loss action sequences; acquiring a high-frequency line loss action from the frequency ordered result; and formulating a targeted loss reduction plan based on the high-frequency line loss action;

(3.2) performing an early warning analysis of line loss actions by:

for the line loss action occurrence conditional probability table, determining a lower threshold M, and if the number of occurrences of a line loss action A that is known to have occurred is less than the lower threshold M, considering the calculated conditional probability as invalid and discarding it; and sorting the line loss action occurrence conditional probability table, excluding invalid conditional probability data, in a descending order according to the conditional probability, to obtain cases with a high conditional probability, so that when a certain line loss action is known to have occurred, a targeted loss reduction plan is formulated and executed for those line loss actions with a high conditional probability.

* * * * *